(No Model.)
G. A GUNTHER & G. L. FOWLER.
METHOD OF TRANSPORTING BEER.
No. 356,714. Patented Jan. 25, 1887.
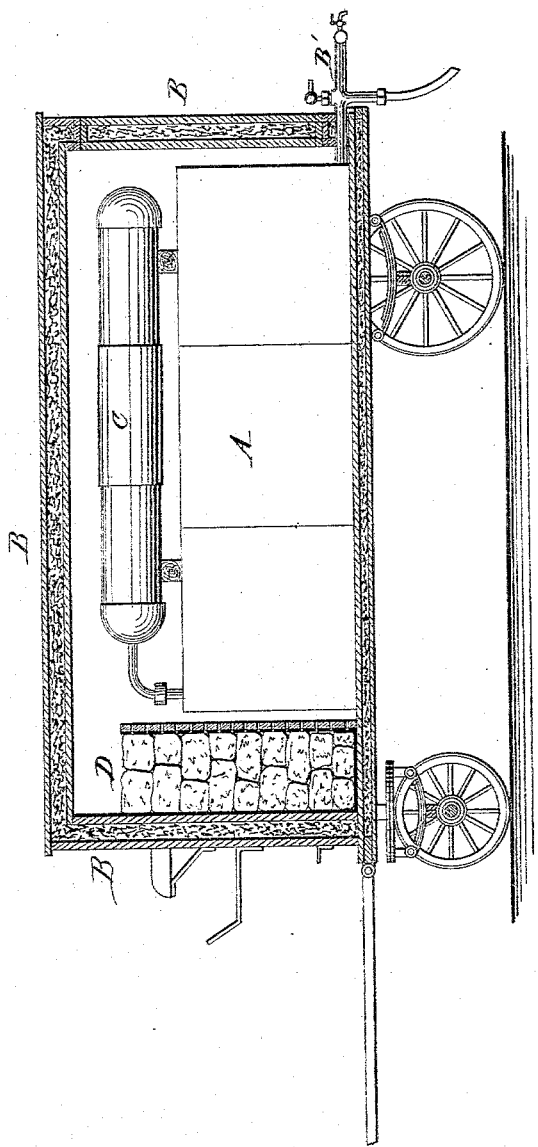
WITNESSES:
A. Schehl.
Carl Karp
INVENTORS
George A. Gunther
and George L. Fowler
BY
Goepel Raegener
ATTORNEYS

UNITED STATES PATENT OFFICE.

GEORGE A. GUNTHER, OF BATH BEACH, AND GEORGE L. FOWLER, OF BROOKLYN, N. Y.; SAID FOWLER ASSIGNOR TO SAID GUNTHER.

METHOD OF TRANSPORTING BEER.

SPECIFICATION forming part of Letters Patent No. 356,714, dated January 25, 1887.

Application filed June 7, 1886. Serial No. 204,437. (No model.)

*To all whom it may concern:*

Be it known that we, GEORGE A. GUNTHER, of Bath Beach, in the county of Kings and State of New York, and GEORGE L. FOWLER, of Brooklyn, in the county of Kings and State of New York, have invented certain new and useful Improvements in the Method of Transporting Beer, of which the following is a specification.

This invention relates to an improved method of shipping or transporting beer and other fermented liquors from the vaults to the place where they are to be dispensed for use, the method being designed with a view to obviate the bunging of the beer into kegs for shipping, and to dispense with the labor of tapping the kegs in places where large quantities of fermented liquors are used.

The invention consists of a method of shipping or transporting beer from the vaults to the place of consumption by transferring the beer or other fermented liquor under pressure into a portable refrigerator-tank, in which it is kept at the same or nearly the same temperature as that of the vaults, conveying it in said tank to the place of use, and transferring the contents to a stationary refrigerator-tank at the place of use.

The accompanying drawing represents a vertical longitudinal section of our improved tank-wagon, which illustrates one form of carrying our improved method of transporting beer and other fermented liquors into practice.

In carrying out our improved method of transporting beer from the vaults to the place of use, the beer or other fermented liquor is first transferred from the storage-casks in the vaults of the brewery, by means of compressed air, into a portable tank, A, of considerable size, in place of being drawn off into kegs. The tank A is supported on wheels and inclosed by a double-walled casing, B. Before closing the tank there may be added to the same a sufficient quantity of bicarbonate of soda, if such be desired, to produce the better foaming of the beer, in the same manner as kegs are now "salted."

In case the beer is to be sent to bottlers, the use of bicarbonate of soda is dispensed with, as they prefer to bottle the beer without the same. The double-walled casing B is filled with a non-conducting material in the same manner as refrigerators, and provided with an ice-chamber, D, and suitable channels for the cold air, so that the beer while in transit is kept at the same or nearly the same temperature as the temperature of the vaults from which the beer has been drawn.

The tank is provided with a valved discharge-pipe, B', at the rear end, and connected with a suitable pressure apparatus, C, that is located either above or in any other relative position to the tank. A carbonic-acid-pressure apparatus is used by preference, so that the beer does not come in contact with atmospheric air.

The pressure apparatus C is connected by a pipe having a pressure-regulating valve with the tank A, so that when the tank-wagon arrives at the point of destination the pressure apparatus can be readily connected with the tank, so as to place the liquor in the tank under pressure. The discharge-pipe B' is next coupled to a hose connected with a stationary tank or other reservoir located in a refrigerator at the point of use. By opening the valve of the discharge-pipe the contents are quickly transferred to the stationary or other refrigerator-tank. The connection of the pressure apparatus and the tank is then interrupted, so as to save as much as possible the carbonic-acid gas in the same, the discharge-pipe closed, and the tank returned to the brewery to be cleaned and filled again, after which it is ready to start on its next trip.

Our improved method of transporting beer has the following advantages: First, it dispenses with the bunging of beer or other fermented liquors into kegs of small size when large quantities are required, and the subsequent labor and loss of beer incidental to tapping; secondly, the beer or other fermented liquor is delivered at the same or nearly the same temperature as that of the vaults, by which the quality of the beer and its taste are preserved, and the change from a lower temperature to a higher temperature and back again to a lower temperature is avoided; thirdly, customers requiring large quantities of beer can be served in a quicker and more convenient manner, and can again dispense the beer at a more uniform temperature in a better condition and with less loss of liquor; fourthly, the loss and damage to the kegs is to a great extent dispensed with, also a great part of the labor required for transferring and handling the kegs; fifthly, the tank-wagon can also be used for dispensing fermented liquors of smaller quantities by providing the discharge-pipe with one or more faucets, so that the same is applicable for dispensing liquors at retail in streets, at picnics, base-ball matches, militia parades, and other public gatherings.

Having thus described our invention, we claim as new and desire to secure by Letters Patent—

The method herein described of transporting beer from the vaults to the place of use, which consists in transferring it under pressure to a portable refrigerated tank; secondly, conveying it to the place of use and keeping it while in transit at the same or nearly the same temperature as that of the vaults, and, thirdly, drawing it under pressure from the tank into a storage-reservoir or directly for use, substantially as set forth.

In testimony that we claim the foregoing as our invention we have signed our names in presence of two subscribing witnesses.

GEORGE A. GUNTHER.
GEO. L. FOWLER.

Witnesses:
PAUL GOEPEL,
CARL KARP.